United States Patent [19]

Svedas et al.

[11] 4,113,677

[45] Sep. 12, 1978

[54] POLISHED COMPOSITION CONTAINING MICROCRYSTALLINE WAX

[75] Inventors: Stanley Svedas; Champak C. Shah, both of Chicago, Ill.

[73] Assignee: Turtle Wax, Inc., Chicago, Ill.

[21] Appl. No.: 649,078

[22] Filed: Jan. 14, 1976

[51] Int. Cl.² ............................................. C08L 7/02
[52] U.S. Cl. .............................. 260/23 R; 260/28.5 B; 260/29.7 GP
[58] Field of Search ......... 260/29.7 GP, 23 R, 28.5 B

[56] References Cited

U.S. PATENT DOCUMENTS

| | | | |
|---|---|---|---|
| 2,394,833 | 2/1946 | Young et al. ........................ | 426/308 |
| 2,482,888 | 9/1949 | Walsh ........................... | 260/29.7 GP |
| 3,406,133 | 10/1968 | Hartshorn ...................... | 260/28.5 B |
| 3,580,875 | 5/1971 | Behnke ............................. | 260/23 R |

*Primary Examiner*—M. J. Welsh
*Attorney, Agent, or Firm*—Vogel, Dithmar, Stotland, Stratman & Levy

[57] ABSTRACT

There is disclosed a polish having a controlled rate of evaporation and capable of withstanding large differentials in temperature which is applicable to an automobile finish as a dilute solution in hot water and method of making same. The polish contains amino functional silicones, dimethyl silicone fluids, a silicone resin film former, an emulsifiable microcrystalline wax, mineral oil, an aliphatic hydrocarbon, as well as dicoco dimethyl ammonium chloride, ethomeen acetate, a metal stearate, an ethoxylated phenol wetting agent and a cyclized rubber with the balance being soft water. Thixotropic viscosity modifiers are provided as well as perfumes and dyes.

17 Claims, No Drawings

POLISHED COMPOSITION CONTAINING MICROCRYSTALLINE WAX

BACKGROUND OF THE INVENTION

The present invention is directed to polishes, and more particularly to polishes having a controlled rate of evaporation and capable of withstanding large temperature differentials which can be applied to an automobile as a dilute dispersion in hot water and which imparts thereto a high and deep luster which is resistant to detergents and requires little buffing.

BRIEF SUMMARY OF THE INVENTION

It is a general object of the present invention to provide an improved polish having a controlled rate of evaporation and capable of withstanding large temperature differentials which is applicable to an automobile finish as a dilute dispersion in hot water and which imparts a high and deep luster with little buffing and has an excellent resistant to detergents.

It is an important object of the present invention to provide a polish and method of making same, the polish having a controlled rate of evaporation and capable of withstanding large differentials in temperature which is applicable to an automobile finish as a dilute dispersion in hot water, the polish comprising an amino functional silicone and a dimethyl silicone fluid present in a combined amount of from about 3 to about 6 parts by weight with the amino functional silicone being present in an amount not less than 0.1 parts by weight and the dimethyl silicone fluid being present in an amount not less than 0.1 parts by weight; from about 0.8 to about 1.4 parts by weight of an emulsifiable microcrystalline wax; from about 6 to about 16 parts by weight of a mineral oil having an SSU viscosity at 100° F. in the range between about 40 and about 100; from about 13 to about 31 parts by weight of an aliphatic hydrocarbon having an initial boiling point of about 375° F. and an end boiling point of about 500° F.; from about 0.1 to about 10 parts by weight of dicoco dimethyl ammonium chloride; from about 0.1 to about 3.5 parts by weight ethomeen acetate; from about 0.1 to about 3 parts by weight of a metal stearate selected from the class consisting of aluminum stearate, calcium stearate and magnesium stearate; from about 0.1 to about 2 parts by weight of ethoxylated phenol wetting agent; from about 0.015 to about 1.125 parts by weight of a cyclized rubber; and the balance water; the ratio by weight between the silicones and the wax being in the range from about 2.5 to about 4.1; the ratio by weight between the silicones and the mineral oil being in the range from about 0.3 to about 0.5; the ratio by weight between the silicones and the aliphatic hydrocarbon being in the range from about 0.15 to about 0.23; whereby there is provided a polish having a controlled rate of evaporation and capable of withstanding large differentials in temperature which is applicable to an automobile finish as a dilute solution in hot water to provide a protective coating having high detergent and wear resistance and a deep luster.

Another object of the present invention is to provide a polish of the type set forth wherein there is provided a silicone resin film former to provide a uniform protective coating without streaks.

Another object of the present invention is to provide a polish of the type set forth including a tallow fatty acid and morpholine to dissolve the cyclized rubber into the aliphatic hydrocarbon.

A further object of the present invention is to provide a polish of the type set forth containing isopropyl alcohol to stabilize the emulsion formed and to couple the aliphatic hydrocarbon and the water.

Further features of the invention pertain to the particular ingredients and ranges of ingredients of the polish, whereby the above-outlined and additional features thereof are attained. The invention, both as to the polish formation and the method of making the same, together with further objects and advantages thereof will best be understood by reference to the following specification and in particular to the specific examples contained therein. It is to be understood that the following examples are given for illustrative purposes only and in no way are to be considered to be limitative of the invention.

PREFERRED EMBODIMENTS OF THE INVENTION

EXAMPLE No. 1

To a clean master vessel, the following materials were added and then mixed for 10 minutes until they were uniform:

1,760 lbs. of 40 white mineral oil
2,544 lbs. of Isopar-M, ® an aliphatic hydrocarbon
272 lbs. of a 50% mixture of Dow Corning 536, an amminofunctional silicone resin
432 lbs. of a dimethyl silicone fluid (10,000 centistokes)
896 lbs. of Variquat K-300 (a cationic detergent of dicoco dimethyl ammonium chloride)
112 lbs. of Surfonic N-95 (an ethoxylated phenol wetting agent)

To a separate clean vessel there was added the following materials:
68 lbs. of ethomeen S/12, and
11 lbs. of glacial acetic acid The ethomeen and glacial acetic acid were mixed until thoroughly uniform and clear. Then the following item was added:

136 lbs. of a 100% mixture of Dow Corning 536, an amminofunctional silicone polymer The entire mixture was mixed until thoroughly uniform and clear and thereafter the mixture was transferred to the master vessel wherein the entire charge was mixed and the temperature raised to between 180° and 185° F.

The following components were added to a clean melting vessel and heated to between 195° and 200° F. until thoroughly uniform and clear:

640 lbs. of Isopar-M ®
160 lbs. of petronauba-C wax

When the wax was melted and clear and the resulting mixture uniform, it was transferred to the master vessel.

To the master, vessel, the following materials were slowly added in the order listed below and the entire mixture agitated while the temperature was raised to between 195° and 200° F.:

237.6 lbs. Alpex C-8415 intermediate, and
64 lbs. of aluminum stearate

The Alpex C-8415 is a cyclized rubber and the Alpex C-8415 intermediate was made up of 201.6 lbs. of Isopar-M ® and 36 lbs. of the Alpex C-8415 in a 15% solution.

8,668.4 lbs. of soft water was added to the master vessel with vigorous mixing until the entire mixture was uniform and clear.

The polish of Example 1 was applied in a dilute solution in hot water to an automobile finish. About 120 milliliters or about 4 fluid ounces were mixed into about ½ gallon of hot water, and thereafter stirred thoroughly before being applied to the automobile finish. A sponge dipped into the polish may be wiped over the car finish and thereafter the polish dried immediately with a clean soft cloth. No further buffing was required. The polish thus applied to an automobile finish was stable for at least four cycles of freeze-thaw temperatures and exposure for over 8 months at 105° F. showed no adverse affect. Further, the shelf life of the polish was greater than nine months.

Detergent resistance of the polish has been determined to be about 8. That is, an automobile protected with the polish set forth in Example 1 has been washed in a commercial car wash 8 times before the protective polish film began to loose effectiveness. It is believed that the improved and unique properties of the polish are due to the excellent wetting of the automobile finish, the mild cleaning action the polish enhanced through the mechanical wiping of the car finish, and the plating out of the silicones on the automobile finish.

The white mineral oil used in Example 1 is a #40 white mineral oil having a stable viscosity at 100° F. of 40/46; a specific gravity at 60° F. of 0.809/0.823; a saybolt color of +30; a cloud point in degrees F ASTM max. of 40°; a pour point in degrees F ASTM max. of 35°; a flash point of 270° F.; and a fire point of 300° F. The #40 white mineral oil used in Example 1 was obtained from the Sonneborn Division of Witco Chemical Company in Chicago, Illinois. Any mineral oil having an SSU viscosity at 100° F. in the range of about 40 to about 100 is applicable to the polish of the present invention. The mineral oil may be present in an amount from about 6 parts by weight to about 16 parts by weight. Less than about 6 parts by weight of the mineral oil results in a polish having a low viscosity and poor evaporation characteristics while greater than about 16 parts by weight results in a polish with a too high viscosity and poor evaporation characteristics, in that the polish does not dry satisfactorily.

The Isopar-M ® is a product of the Exxon Corporation and is an odorless, relatively high boiling, narrow-cut isoparaffinic solvent. It has a flash point of about 170° F. and a high auto-ignition temperature of 730° F. Impurities such as sulfur, acids, carbonyls, chlorides and others are limited to a few parts per million. The initial boiling point is 410° F. and the final boiling point is 484° F. The average molecular weight is 191, the total saturated hydrocarbon content being 99.7 with about 0.2% aromatics and 0.1% olefins. The saybolt color is +30 with a gravity in API, 60/60° F. of 49.0 and a calculated specific gravity 60/60° F. of 0.784. The refractive index at 20° C. is 1.4362. Any aliphatic hydrocarbon having an initial boiling point of about 375° F. and an end boiling point of about 500° F. may be substituted for the Isopar-M ® disclosed in Example 1. The aliphatic hydrocarbon may be present in a range from about 13 parts by weight to about 31 parts by weight. Less than about 13 parts by weight aliphatic hydrocarbon results in a polish wherein the cyclized rubber and waxes are not dissolved whereas a polish having greater than about 31 parts by weight aliphatic hydrocarbon results in a polish with poor evaporation characteristics.

The Dow Corning 531 amminofunctional silicone polymer is a polydimethyl siloxane which is polar in nature and adheres strongly to automobile finishes, chrome and aluminum surfaces. The amminofunctional silicones have excellent detergent resistance, provide durable corrosion resistance, provide deep gloss and are soluble in most aliphatic hydrocarbons. The Dow Corning 531 amminofunctional silicone is substantially colorless and has a viscosity in centistokes at 77° F. (25° C.) of 150; a refractive index at 77° F. of 1.410; a specific gravity at 77° F. of 0.860 and a flash point, open cup, of 95° F. The amminofunctional silicones may be present in an amount from about 3 parts by weight to about 6 parts by weight. If less than about 3 parts by weight is used, the polish will not have the durability and detergent resistance that is required while greater than about 6 parts by weight results in waste. Other amminofunctional silicones are available from Stauffer-Walker designated as SW-756 and SW-770. International Chemical Inc., an English Corporation, also provides an amminofunctional silicone resin under the trade designation ICI-M466.

The dimethyl siloxane fluid is an extender for the amminofunctional silicones and preferably has a viscosity of between about 5 and 20,000 centistokes at 77° F. The dimethyl siloxane fluid provides luster as well as also providing some additional detergent resistance to the polish. The dimethyl siloxane fluid may be present in an amount of from 0.1 parts by weight to about 10 parts by weight, too little siloxane resin resulting in a polish with low gloss characteristics and poor protection while too much siloxane resins are wasteful.

The Surfonic N-95 is a water soluble wetting agent gelatinous at room temperature. Surfonic N-95 is a 9.5 mol nonylphenol-ethylene oxide. The specific gravity at 20/20° C. is 1.061; the refractive index at 20° C. is 1.4893; the freezing point is less than 0° C.; the flash point is 475° F.; the weight in pounds per gallon at 20° C. is 8.7. The theoretical molecular weight is 484 and the SUS viscosity at 210° F. is 58 and at 100° F. is 440. The surface tension in dynes per centimeter at 25° C. is 28.7. The Surfonic N-95 wetting agent serves to wet the automobile surface finish thereby providing better contact between the polish and the automobile surface. The wetting agent may be present in an amount from between 0.1 parts by weight to about 2.0 parts by weight. Less than about 0.1 parts by weight is not effective to provide the necessary wetting qualities between the automobile surface and the polish while greater than 2 parts by weight is wasteful. Alternatives to Surfonic N-95 are octylphenol ethylene oxides and other wetting agents for instance those sold by Rhome and Haas under the trade designation "Triton X-100" and that sold by the Stepan Company under the trade designation "Mekon-10" and that sold by the Antria Company under the trade designation "Igepal CO-630".

The Variquat K-300 is a cationic detergent made from dicoco dimethyl ammonium chloride, an amber liquid having a pH of between 5 and 7 and a density of 7.2 pounds per gallon. The Variquat K-300 assists in plating the amminofunctional silicones and the dimethyl siloxanes onto the automobile surface; the Variquat K-300 also is an emulsifier for the mineral oil and the silicone resins and importantly causes water to bead once the polish is laid down on the automobile finish. The dicco dimethyl ammonium chloride is also available under the trade designation "Arquad-2C". The dicco dimethyl ammonium chloride may be present in the range from 0.1 parts by weight to 10 parts by weight. Less than 0.1 parts by weight is ineffective to plate out the silicones and more than 10 parts by weight is wasteful.

The ethomeen S/12 is a soybean amine having an average molecular weight of about 350, a specific gravity at 25/25° C. of 0.911 and a density at 25° C. of 75.9 pounds per gallon. The ethomeen S/12 reacts with the glacial acetic acid to provide ethomeen acetate which solubilizes the amminofunctional silicones into the system. The ethomeen acetate may be present in an amount between 0.1 parts by weight and about 3.5 parts by weight. Less than about 0.1 parts by weight is insufficient to solubilize the amminofunctional silicones whereas greater than about 3.5 parts by weight is wasteful.

The Dow Corning 536 is an amminofunctional polydimethyl siloxane similar to the Dow Corning 531. The Dow Corning 536 has a light straw color; a viscosity in centistokes at 77° F. (25° C.) of 35; a refractive index at 77° F. of 1.408; a specific gravity at 77° F. of 0.958; and a flash point, open cup, of 95° F. The amminofunctional Dow Corning 536 resin may be present in an amount between 0.1 parts by weight and 5.0 parts by weight with less than 0.1 parts by weight being insufficient to provide the bonding necessary for the improved detergent resistance and durability of the present wax product. Greater than about 5.0 parts by weight may be wasteful unless the total amount of amminofunctional silicones present does not exceed about 6 parts by weight. Alternatives for the Dow Corning 536 are the same as the alternatives for the Dow Corning 531.

The petronauba-C is an emulsifiable microcrystalline wax with a minimum melting point of about 180° F.; a maximum pentration at 77° F. of 7 and a #3 color on the ASTM D1500 scale; an acid number of 22/28 and a sponification number of 50/60. The wax provides improved gloss and hardness to the polish and may be present from about 0.8 parts by weight to about 1.4 parts by weight. Too little wax results in a polish of inferior hardness and gloss whereas too much wax results in waste and also may be difficult to emulsify. Acceptable alternatives for the specific wax used in Example 1 are any emulsifiable microcrystalline wax having a melting point in the range of between about 140° F. and about 200° F. The wax used in Example 1 was obtained from the Baraco Division of Petrolite Corporation.

The Alpex C-8415 is a cyclized rubber which provides improved gloss, detergent resistance, superior shine and longer durability. The Alpex C-8415 may be present in the amount between 0.1 parts by weight and 7.5 parts by weight. Too little cyclized rubber results in a polish which does not have the superior shine, durability, detergent resistance and gloss of the present invention. Too much cyclized rubber results in a polish which may not be emulsified properly or in which the cyclized rubber is not dissolved into the aliphatic hydrocarbon. Additionally, too much cyclized rubber is wasteful. The cyclized rubber may be purchased from Chemische Werke Albert Wiesbaden-Biebrich. Cyclized rubber is also available under the trade name "Synotex-800".

The aluminum stearate used was obtained from Witco Chemical Company and has a total acid content of 9.1% by weight, a free fatty acid content of 6.5% by weight, water soluble water salts present in an amount of 0.2% by weight, moisture content of about 0.5% by weight, a softening point in degrees centigrade of 160 and a specific gravity of 1.01. The aluminum stearate is a suspension former, an emulsion stabilizer and provides improved bonding of the polish to metal and paint finishes. The aluminum stearate also functions to control the polish viscosity and may be present in an amount of about 0.4 parts by weight ±20%. Too little aluminum stearate results in a poor suspension being formed and relatively unstable emulsions. Also, the bonding of the polish to the metal or paint surface is not as good. Too much aluminum stearate would provide a polish which is too viscous and would not evaporate in the required amount of time and at the required rate. Alternatives for aluminum stearate are calcium and magnesium stearates.

The ratios of constituents to each other are particularly important to provide a polish having the unique properties disclosed in Example 1. The outstanding product performance is obtained by maintaining the individual components at certain predetermined ratios to provide the necessary interaction between the individual components. For the exceptional stabilization and the uniformity of the dispersion of the polish in hot water during its use, it is critical for product performance that the ratio by weight between the silicones and the wax be in the range from about 2.5 to 4.1 with a ratio of about 3.4 being preferred; the ratio by weight of the silicones to the mineral oil be in the range from about 0.3 to 0.5 with a ratio of 0.37 being preferred; and the ratio by weight between the silicones and the aliphatic hydrocarbon be in the range from about 0.15 to about 0.23 with a ratio of 0.19 being preferred. Other ratios which are of paramount importance are the ratio between silicones and ethomeen acetate which should be in the range of 6.8 to 10.3 with a ratio of 8.6 being preferred; the ratio of water to aliphatic hydrocarbon in the polish should be in the range of 1.9 to 3.0 with a ratio of 2.44 being preferred; and the ratio of aliphatic hydrocarbon to wax should be in the range of about 14 to about 22 with a ratio of about 17.7 being preferred.

EXAMPLE NO. 2

To a clean master vessel, the following materials were added and then mixed for ten minutes until they were uniform:

1,760 lbs. of #40 white mineral oil
2,544 lbs. of Isopar-M ®
112 lbs. of General Electric silicone resin CS-4150
272 lbs. of a 50% mixture of Dow Corning 531
320 lbs. of dimethyl silicone fluid (10,000 centistokes)
112 lbs. of Surfonic N-95
896 lbs. of Variquat K-300

To a separate clean vessel, there was added the following materials:

68 lbs. of ethomeen S/12 and
11 lbs. of glacial acetic acid

The ethomeen and glacial acetic acid were mixed until thoroughly uniform and clear. Then the following was added:

136 lbs. of 100% Dow Corning 536

The entire mixture was mixed until thoroughly uniform and clear and thereafter the mixture was transferred to the master vessel wherein the entire charge was mixed and the temperature raised between 180° and 185° F.

The following components were added to a clean melting vessel and heated to 195° to 200° F. and mixed until thoroughly uniform and clear:

640 lbs. of Isopar-M ®, and
160 lbs. of petronauba-C wax

When the wax was melted and clear and the resulting mixture uniform, it was transferred to the master vessel.

To the master vessel, the following materials were slowly added in the order listed below and the entire mixture agitated while the temperature was raised to between 195° and 200° F.

237.6 lbs. of Alpex C-8415 intermediate, and
64 lbs. of aluminum stearate

The Alpex C-8415 is a cyclized rubber and the Alpex C-8415 intermediate was made up of 36 lbs. of a 15% solution of Alpex C-8415 and 201.6 lbs. of Isopar-M ®.

8,667.4 lbs. of soft water was added to the master vessel and the entire mixture was vigorously mixed until the mixture was thoroughly uniform and clear.

The polish of Example 2 was applied in a dilute solution of hot water to an automobile finish. The polish of Example 2 was superior to the polish of Example 1 in that the coating laid down was uniform and had no streaks, the General Electric silicone resin CS-4150 being a film former and preventing streaking in the polish coating.

The CS-4152 silicone resin is obtained from General Electric Corporation and is useful as a film former to provide a uniform polish film on the automobile finish thereby preventing streaking. The silicone resin used in Example 2 designated as CS-4152 is a liquid with a clear, straw color; a viscocity at 25° C. of 35 centistokes; a specific gravity, 25/25° C. of 0.88; a weight per gallon of 7.36 pounds and an approximate flash point — tag open cup ASTM D 1310 of 125° F. The silicone resin film former may be present from about 0.1 parts by weight to about 5.0 parts by weight and is used to insure that the polish coating is uniformly applied to the automobile finish without streaking. 0.1 parts by weight is the least effective amount to prevent streaking and greater than 5 parts by weight is wasteful.

EXAMPLE NO. 3

To a clean master vessel, the following materials were added and then mixed for ten minutes until they were uniform:

1,760 lbs. of #40 white mineral oil
2,544 lbs. of Isopar-M ®
272 lbs. of a 50% mixture of Dow Corning 531
432 lbs. of dimethyl silicone fluid (10,000 centistokes)
112 lbs. of Surfonic N-95
896 lbs. of Variquat K-300

To a separate clean vessel there was added the following materials:

68 lbs. of ethomeen S/12, and
11 lbs. of glacial acetic acid

The ethomeen and glacial acetic acid were mixed until thoroughly uniform and clear. Then the following item was added:

136 lbs. — 100% Dow Corning 536 ammino functional silicone

The entire mixture was mixed until thoroughly uniform and clear and thereafter the mixture was transferred to the master vessel wherein the entire charge was mixed and the temperature raised to between 180° and 185° F.

The following constituents were added to a clean melting vessel and heated to 195° to 200° F. and mixed until thoroughly uniform and clear;

640 lbs. of Isopar-M ®, and
160 lbs. of petronauba-C wax

When the wax was melted and clear and the resulting mixture uniform, it was transferred to the master vessel.

To the master vessel, the following materials were slowly added in the order listed below and the entire mixture agitated while the temperature was raised to between 195° and 200° F.:

240 lbs. Alpex C-8415 intermediate, and
64 lbs. of aluminum stearate

The Alpex C-8415 is a cyclized rubber and the Alpex C-8415 intermediate was made up of the following ingredients:

Alpex C-8415 — 15% or 36 lbs. of a 15% solution
Acintol EPG 0.5% or 1.2 lbs.
Morpholine 0.5% or 1.2 lbs.
Isopar-M ® 84% or 201.6 lbs.

8,664.4 lbs. of soft water was added to the master vessel and the entire mixture was thoroughly agitated and mixed until the mixture was uniform and clear.

The polish of Example 3 was applied in a dilute solution of part water to an automobile finish and performed as well as that of Example 1. The combination of the Acintol EPG and the Morpholine made it easier to dissolve the Alpex C-8415 into the aliphatic hydrocarbon.

In Example 3, the Alpex C-8415 is introduced in solution with Acintol EPG, morpholine and an aliphatic hydrocarbon. The Acintol EPG is a tallow fatty acid which reacts with the morpholine, a base, to provide a soap emulsifier for the cyclized rubber. The emulsifier aids in dissolving the cyclized rubber into the Isopar-M ®, which is the aliphatic hydrocarbon used in Example 1. The Acintol EPG is present in the range of 0.0075 parts by weight ±20%. If too little Acintol EPG is present than too little soap will be formed and the emulsion will break down thereby not assisting in dissolving the cyclized rubber into the aliphatic hydrocarbon. Too much soap would not necessarily be deleterous to the polish; however, it is wasteful and it if is accompanied by too much morpholine then the pH of the mixture may be too high and the polish may attack the automobile finish. The limits for the amount of morpholine present are the same as for the Acintol EPG. The reasons for using the prescribed amount of morpholine are also the same since the morpholine reacts with the Acintol EPG or other tallow fatty acids to form the desired emulsion. The aliphatic hydrocarbon used is Isopar-M ® but any suitable hydrocarbon set forth above may be substituted. Any tallow fatty acid, such as, oleic acid may be substituted for the Acintol EPG.

EXAMPLE NO. 4

To a clean master vessel, the following materials were added and then mixed for 10 minutes until they were uniform:

1,760 lbs. of #40 white mineral oil
2,544 lbs. of Isopar-M ®
272 lbs. of a 50% mixture of Dow Corning 531
432 lbs. of a dimethyl silicone fluid (10,000 centistokes)
112 lbs. of Surfonic N-95, and 896 lbs. of Variquat K-300

To a separate clean vessel there was added the following materials:

68 lbs. of ethomeen S/12, and
11 lbs. of glacial acetic acid

The ethomeen and glacial acetic acid were mixed until thoroughly uniform and clear. Then the following compounds were added:

136 lbs. of a 100% Dow Corning 536 silicone resin
8 lbs. of anhydrous isopropyl alcohol The entire mixture was mixed until thoroughly uniform and clear and thereafter the mixture was transferred to the master heating vessel wherein the entire charge was mixed and the temperature raised to between 180° and 185° F.

The following components were added to a clean melting vessel and heated to 195° to 200° F. and mixed until thoroughly uniform and clear:

640 lbs. of Isopar-M ®, and
160 lbs. of petronauba-C wax

When the wax was melted and clear and the resulting mixture uniform, it was transferred to the master vessel.

To the master vessel, the following materials were slowly added in the order listed below and the entire mixture agitated while the temperature was raised to between 195° and 200° F.:

36 lbs. of a 15% solution of Alpex C-8415 in 201.6 lbs. of Isopar-M ®, and
64 lbs. of aluminum stearate The entire mixture was agitated and 8,667.4 lbs. of soft water was added. Agitation was continued until the entire mixture was uniform and clear.

The polish of Example 4 was applied in a dilute solution in hot water to an automobile finish. The polish performed satisfactory as the polish of Example 1; however, the shelf life of the polish of Example 4 was greater than the shelf life of the polish in Example 1 since the isopropyl alcohol acted to provide a more stable emulsion.

The isopropyl alcohol serves to couple the water to the mixture and is an emulsion stabilizer. The isopropyl alcohol may be present in an amount between 0.05 parts by weight ±20%. Too little isopropyl alcohol results in an emulsion which is not as stable as preferred whereas too much isopropyl alcohol does not improve the characteristics of the mixture.

EXAMPLE NO. 5

To a clean master vessel, the following materials were added and then mixed for ten minutes until they were uniform:

1,760 lbs. of 40 white maneral oil
1,995 lbs. of Isopar-M ®, an aliphatic hydrocarbon
112 lbs. of General Electric silicone resin CS-4150
272 lbs. of a 50% mixture of Dow Corning 531 amminofunctional silicone resin
320 lbs. of a dimethyl silicone fluid (10,000 centistokes)
112 lbs. of Surfonic N-95 (an ethoxylated phenol wetting agent)
896 lbs. Variquat K-300 (a catonic detergent of dicco dimethyl ammonium chloride)

To a separate clean vessel, there was added the following materials:

68 lbs. of ethomeen S/12, and
11 lbs. of glacial acetic acid

The ethomeen and glacial acetic acid were mixed until thoroughly uniform and clear. Then the following items were added:

136 lbs. — 100% Dow Corning 536 amminofunctional silicone polymer
8 lbs. of anhydrous isopropyl alcohol The entire mixture was mixed until thoroughly uniform and clear and thereafter the mixture was transferred to the master vessel wherein the entire charge was mixed and the temperature raised to between 180° and 185° F.

The following components were added to a clean melting vessel, and heated to 195° to 200° F. and mixed until thoroughly uniform and clear:

640 lbs. of Exxon Isopar-M ® (aliphatic hydrocarbon,) and
160 lbs. of petronauba-C wax When the wax was melted and clear and the resulting mixture uniform, it was transferred to the master vessel.

To the master vessel, the following materials were slowly added in the order listed below and the entire mixture agitated while the temperature was raised to between 195° and 200° F:

240 lbs. of Alpex C-8145 intermediate, and
64 lbs. of aluminum stearate

The Alpex C-8415 is a cyclized rubber and the Alpex C-8415 intermediate was made up of the following ingredients:

| Alpex C-8415 | 15% |
|---|---|
| Acintol EPG | 0.5% |
| Morpholine | 0.5% |
| Isopar-M ® | 84.0% |
| | 100.0% |

To a clean separate vessel, 960 gallons or 8,000 lbs. of soft water and 320 lbs. of a wax base intermediate consisting of the following ingredients were added:

| | |
|---|---|
| Armac HT | 3.8 |
| Carnauba | 10.0 |
| Soft water | 86.2 |
| | 100.0 |

Vigorous mixing was employed until the entire mixture was emulsified while the temperature was maintained at 190° to 195° F.; thereafter the mixture was added to the master vessel.

The master vessel was cooled to a temperature of between 180° and 185° F. and the following material was slowly added while the entire mixture was agitated:

560 lbs. of a 2% Thixcin-R in Isopar-M ® That mixture was mixed until completely dispersed and thoroughly uniform with care being used not to boil out any of the component parts.

The master vessel was cooled to 140° F. and 320 lbs. of a 1% solution of Pylaklor Pink dye was added. The batch was agitated and mixed until the color was uniform and thereafter the master vessel was cooled to a temperature of about 110° F. when there was added 4 lbs., 13 ounces of a perfume 3424 obtained from the Pykam Company and the resulting mixture was completely agitated and mixed until the perfume was uniformly dispersed throughout.

The wax base intermediate is comprised of Armac-HT, an amine acetate, carnauba wax and soft water. The Armac-HT is an amine acetate 25% of which is a hexadecyl, 72% is a saturated octacecyl and 3% is a mono unsaturated octadecenyl. The amine molecular weight of the primary amine acetate is 323, the melting point is 60° C., the average apparent molecular weight is 342 and the maximum moisture is 2% by weight. The Armac-HT is present in the amount of about 0.076 parts by weight ±20% the Armac-HT acts as an emulsifier for the hard carnauba wax. Too little Armac-HT results in the carnauba wax not being emulsified and too much Armac-HT is wasteful. The carnauba wax is present in an amount of about 0.2% and is a hard wax which provides hardness to the polish but is not absolutely necessary to the successful formulation of the polish. The carnauba wax may be varied in amounts ±20% of the given weight without adversely affecting the performance of the polish. Use of 100% microcrystalline wax will also provide a satisfactory polish. Other hard waxes may be substituted for the carnauba wax without adversely affecting the polish performance.

The 2% Thixcin-R solution in Isopar-M ® is a thixotropic viscosity modifier. The 2% Thixcin-R solution is present in Example 5 in the amount of 3.5% by weight; however, the amount of actual Thixcin-R present in the polish is 0.07 parts by weight. The amount of Thixcin-R present may be varied about ±20% without seriously adversely affecting the properties of the polish. Thixcin-R is a thixotrope obtained from Baker Castor Oil Company and has a density in pounds per gallon of 25° C. of 8.51, a bolting value in gallons per pounds at 25° C. of 0.118, and specific gravity at 25° C/25° C. of 1.023. Thixcin-R is powder and may be dissolved in any aliphatic hydrocarbon such as Isopar-M ®. Alternatives for the Thixcin-R are any thixotropic substance which will provide the required viscosity control and which is not deleterous to metal or automobile finishes.

The dyes and perfumes used and standard in the art and are mere matter of choice between various art recognized alternatives. The amount of Pylaklor Pink dye in Example 5 was 2% by weight and may be varied within reasonable limits without adversely affecting the polish. The perfume used in Example 5 was present in an amount of 0.03 parts by weight and also may be varied within reasonable limits without adversely affecting the polish.

EXAMPLE NO. 6

To a clean master vessel, the following materials were added and then mixed for ten minutes until they were uniform:

960 lbs. of 40 white mineral oil
1,238.4 lbs. of Isopar-M ®
112 lbs. of General Electric silicone resin CS-4150
160 lbs. of a 50% mixture of Dow Corning amminofunctional silicone resin 531
272 lbs. of a dimethyl silicone fluid (10,000 centistokes)
112 lbs. of Surfonic N-95, and
896 lbs. of Variquat K-300

To a separate clean vessel, there was added the following materials:

68 lbs. of ethomeen S/12, and
11 lbs. of glacial acetic acid

The ethomeen and glacial acetic acid were mixed until thoroughly uniform and clear. The following item was added:

80 lbs. of 100% Dow Corning 536 amminofunctional silicone

The entire mixture was mixed until throughly uniform and clear and thereafter the mixture was transferred to the master vessel wherein the entire charge was mixed and the temperature raised to between 180° and 185° F.

The following components were added to a clean melting vessel and heated to 195° to 200° F. and mixed until thoroughly uniform and clear:

640 lbs. of Isopar-M ®, and
192 lbs. of petronauba-C wax

When the wax was melted and clear, and the resulting mixture uniform, it was transferred to the master vessel.

To the master vessel, the following materials were slowly added in the order listed below and the entire mixture was agitated while the temperature raised to between 195° and 200° F:

36 lbs. of Alpex C-8415 dissolved in 201.6 lbs. of Isopar-M ®, and
64 lbs. of aluminum stearate The entire mixture was agitated and 10,957 lbs. of soft water was added and mixed until the entire mixture was uniform and clear. The polish of Example 6 was applied to an automobile finish in the same manner as that of Example 1.

EXAMPLE NO. 7

To a clean master vessel, the following materials were added and then mixed for 10 minutes until they were uniform:

2,560 lbs. of a #40 white mineral oil
458.4 lbs. of Isopar-M ®
80 lbs. of General Electric silicone resin CS-4150
640 lbs. of a 50% mixture of Dow Corning 531 amminofunctional silicone resin
112 lbs. Surfonic N-95, and
896 lbs. of Variquat K-300

To a separate clean vessel there was added the following materials:

68 lbs. of ethomeen S/12, and
11 lbs. of glacial acetic acid

The ethomeen and glacial acetic acid were mixed until thoroughly uniform and clear. Then the following item was added:

560 lbs. of 100% Dow Corning 536 amminofunctional silicone

The entire mixture was mixed until throughly uniform and clear and thereafter the mixture was transferred to the master vessel wherein the entire charge was mixed and the temperature raised to between 180° and 185° F.

The following components were added to a clean melting vessel and heated to 195° to 200° F. and mixed until thoroughly uniform and clear:

700 lbs. of Isopar-M ®, and
224 lbs. of petronauba-C wax

When the wax was melted and clear and the resulting mixture uniform, it was transferred to the master vessel. To a master vessel, the following materials were slowly added in the order listed below and the entire mixture agitated while the temperature was raised to between 195° and 200° F.:

237.6 lbs. of Alpex C-8415 intermediate which consisted of 201.6 lbs. of Isopar-M ®, and
36 lbs. of Alpex C-8415 dissolved in the Isopar-M ®, and
64 lbs. of aluminum stearate The entire mixture was agitated while 6,698.6 lbs. of soft water was added and agitation was continued until the entire batch was uniform and clear.

The polish of Example 7 was applied to an automobile finish as a dilute dispersion in hot water much in the same manner as in Example 1. The polish of Example 7 was satisfactory to protect the automobile finish and provide a protective coating having high detergent wear resistance and a deep luster.

EXAMPLE NO. 8

To a clean master vessel, the following materials were added and then mixed for ten minutes until they were uniform:

1,760 lbs. of #40 white mineral oil
2,544 lbs. of Isopar-M ®
112 lbs. of General Electric silicone resin CS-4150
160 lbs. of a 50% mixture of Dow Corning amminofunctional silicone resin 531
208 lbs. of a dimethyl silicone fluid (10,000 centistokes)
112 lbs. of Surfonic N-95, and
896 lbs. of Variquat K-300

To a separate clean vessel there was added the following materials:

68 lbs. of ethomeen S/12, and
11 lbs. of glacial acetic acid

The ethomeen and glacial acetic acid were mixed until thoroughly uniform and clear. Then the following item was added:

80 lbs. of 100% Dow Corning amminofunctional silicone resin 536

The entire mixture was mixed until thoroughly uniform and clear and thereafter the mixture was transferred to the master vessel wherein the entire charge was mixed and the temperature raised to between 180° and 185° F.

The following components were added to a clean melting vessel and heated to 195° to 200° F. and mixed until thoroughly uniform and clear:

640 lbs. of Isopar-M ®, and
128 lbs. petronauba-C wax

When the wax was melted and clear and the resulting mixture uniform, it was transferred to the master vessel.

To the master vessel, the following materials were added in the order listed below and the entire mixture agitated while the temperature was raised to between 195° and 200° F.:

237.6 lbs. of Alpex C-8415 intermediate which consisted of 201.6 lbs. of Isopar-M ®, and
36 lbs. of Alpex C-8415, and
64 lbs. of aluminum stearate The entire mixture was mixed while 8,979.4 of soft water was added. Mixing continued until the entire mixture was thoroughly uniform and clear.

The polish of Example 8 was applied to an automobile finish as a dilute solution in hot water in the same manner as set forth in Example 1. The polish was satisfactory to provide a protective coating having a high detergent and wear resistance and a deep luster.

By the term "cyclized rubber" we mean a long chained natural rubber cyclized by the catalytic isomerization, thereby reducing the number of double bonds present in nature long chained rubbers and making the cyclized rubber more saturated. The average molecular weight of cyclized rubber is in the order of about 5,000.

It will be seen that there have been provided polish formulations and methods for making the same which fulfill all the objects and advantages set forth above. While certain preferred formulations have been disclosed it will be understood that various changes and modifications may be made therein without departing from the spirit and scope of the invention. Accordingly, it is intended to cover in the appended claims all such modifications as fall within the true spirit and scope of the invention.

What is claimed is:

1. A polish having a controlled rate of evaporation and capable of withstanding large differentials in temperature which is applicable to an automobile finish as a dilute solution in hot water, said polish comprising an aminofunctional silicone and a dimethyl silicone fluid present in a combined amount of from about 3 to about 6 parts by weight with the aminofunctional silicone being present in an amount not less than 0.1 parts by weight and the dimethyl silicone fluid being present in an amount not less than 0.1 parts by weight; from about 0.8 to about 1.4 parts by weight of an emulsifiable microcrystalline wax; from about 6 to about 16 parts by weight of a mineral oil having an SSU viscosity at 100° F. in the range between about 40 and about 100; from about 13 to about 31 parts by weight of an aliphatic hydrocarbon having an initial boiling point of about 375° F. and an end boiling point of about 500° F.; from about 0.1 to about 10 parts by weight of dicoco dimethyl ammonium chloride; from about 0.1 to about 3.5 parts by weight ethomeen acetate; from about 0.1 to about 3 parts by weight of a metal stearate selected from the class consisting of aluminum stearate, calcium stearate and magnesium stearate; from about 0.1 to about 2 parts by weight of ethoxylated phenol wetting agent; from about 0.015 to about 1.125 parts by weight of a cyclized rubber; and the balance water; the ratio by weight between said silicones and said wax being in the range from about 2.5 to about 4.1; the ratio by weight between said silicones and said mineral oil being in the range from about 0.3 to about 0.5; the ratio by weight between said silicones and said aliphatic hydrocarbon being in the range from about 0.15 to about 0.23; whereby there is provided a polish having a controlled rate of evaporation and capable of withstanding large differentials in temperature which is applicable to an automobile finish as a dilute solution in hot water to provide a protective coating having high detergent and wear resistance and a deep luster.

2. The polish set forth in claim 1, wherein the microcrystalline wax is petronauba wax.

3. The polish set forth in claim 1, wherein the mineral oil has an SSU viscosity at 100° F. in the range between about 40 and about 50.

4. The polish set forth in claim 1, wherein the aliphatic hydrocarbon has an initial boiling point of about 410° F. and an end boiling point of about 485° F.

5. The polish set forth in claim 1, wherein the ratio by weight between said silicones and said ethomeen acetate is in the range from about 6.8 to about 10.3.

6. The polish set forth in claim 1, wherein the dimethyl silicone fluids have a viscosity at 100° F. in the range between 5,000 and 20,000 centistokes.

7. The polish set forth in claim 1, wherein the water is soft water.

8. The polish set forth in claim 1, wherein the ratio by weight between said water and said aliphatic hydrocarbons is in the range from about 1.3 to about 3.0.

9. The polish set forth in claim 1, wherein the metal stearate is aluminum stearate.

10. The polish set forth in claim 1, wherein the wetting agent is a nonylphenol ethylene oxide.

11. A polish having a controlled rate of evaporation and capable of withstanding large differentials in temperature which is applicable to an automobile finish as a dilute solution in hot water to provide a uniform protective coating without streaks, said polish comprising an aminofunctional silicone, a silicone resin film former, and a dimethyl silicone fluid present in a combined amount of from about 3 to about 6 parts by weight with the aminofunctional silicone being present in an amount not less than 0.1 parts by weight, said silicone resin film former being present in an amount not less than 0.1 parts by weight, and the dimethyl silicone fluid being present in an amount not less than 0.1 parts by weight; from about 0.8 to about 1.4 parts by weight of an emulsifiable microcrystalline wax; from about 6 to about 16 parts by weight of a mineral oil having a SSU viscosity at 100° F. in the range between about 40 and about 100; from about 13 to about 31 parts by weight of an aliphatic hydrocarbon having an initial boiling point of about 375° F. and an end boiling point of about 500° F.; from about 0.1 to about 10 parts by weight of dicoco dimethyl ammonium chloride; from about 0.1 to about 3.5 parts by weight ethomeen acetate; from about 0.1 to about 3 parts by weight of a metal stearate selected from the class consisting of aluminum stearate, calcium stearate and magnesium stearate; from about 0.1 to about 2 parts by weight of ethoxylated phenol wetting agent; from about 0.015 to about 1.125 parts by weight of a cyclized rubber; and the balance water; the ratio by weight between said silicones and said wax being in the range from about 2.5 to about 4.1; the ratio by weight between said silicones and said mineral oil being in the range from about 0.3 to about 0.5; the ratio by weight between said silicones and said aliphatic hydrocarbon being in the range from about 0.15 to about 0.23; whereby there is provided a polish having a controlled rate of evaporation and capable of withstanding large differentials in temperature which is applicable to an automobile finish as a dilute solution in hot water to provide a protective coating without streaks.

12. The polish set forth in claim 11, wherein the silicone resin film former is present in the range between 0.1 and 5.0 parts by weight.

13. A polish having a controlled rate of evaporation and capable of withstanding large differentials in temperature which is applicable to an automobile finish as a dilute solution in hot water, said polish comprising an aminofunctional silicone and a dimethyl silicone fluid present in a combined amount of from about 3 to about 6 parts by weight with the aminofunctional silicone being present in an amount not less than 0.1 parts by weight and the dimethyl silicone fluid being present in an amount not less than 0.1 parts by weight; from about 0.8 to about 1.4 parts by weight of an emulsifiable microcrystalline wax; from about 6 to about 16 parts by weight of a mineral oil having an SSU viscosity at 100° F. in the range between about 40 and about 100; from about 13 to about 31 parts by weight of an aliphatic hydrocarbon having an initial boiling point of about 375° F. and an end boiling point of about 500° F.; from about 0.1 to about 10 parts by weight of dicoco dimethyl ammonium chloride; from about 0.1 to about 3.5 parts by weight ethomeen acetate; from about 0.1 to about 3 parts by weight of a metal stearate selected from the class consisting of aluminum stearate, calcium stearate and magnesium stearate; from about 0.1 to about 2 parts by weight of ethoxylated phenol wetting agent; from about 0.015 to about 1.125 parts by weight of a cyclized rubber; from about 0.006 to about 0.009 parts by weight of a tallow fatty acid; from about 0.006 to about 0.009 parts by weight of morpholine; and the balance water; the ratio by weight between said silicones and said wax being in the range from about 2.5 to about 4.1; the ratio by weight between said silicones and said mineral oil being in the range from about 0.3 to about 0.5; the ratio by weight between said silicones and said aliphatic hydrocarbon being in the range from about 0.15 to about 0.23; whereby there is provided a polish having a controlled rate of evaporation and capable of withstanding large differentials in temperature which is applicable to an automobile finish as a dilute solution in hot water to provide a protective coating having high detergent and wear resistance and a deep luster.

14. The polish set forth in claim 13, wherein said tallow fatty acid is oleic acid.

15. A polish having a controlled rate of evaporation and capable of withstanding large differentials in temperature which has a long shelf life and is applicable to an automobile finish as a dilute solution in hot water, said polish comprising an aminofunctional silicone and a dimethyl silicone fluid present in a combined amount of from about 3 to about 6 parts by weight with the aminofunctional silicone being present in an amount not less than 0.1 parts by weight and the dimethyl silicone fluid being present in an amount not less than 0.1 parts by weight; from about 0.8 to about 1.4 parts by weight of an emulsifiable microcrystalline wax; from about 6 to about 16 parts by weight of a mineral oil having an SSU viscosity at 100° F. in the range between about 40 and about 100; from about 13 to about 31 parts by weight of an aliphatic hydrocarbon having an initial boiling point of about 375° F. and an end boiling point of about 500° F.; from about 0.04 to about 0.06 parts by weight isopropyl alcohol; from about 0.1 to about 10 parts by weight of dicoco dimethyl ammonium chloride; from about 0.1 to about 3.5 parts by weight ethomeen acetate; from about 0.1 to about 3 parts by weight of a metal stearate selected from the class consisting of aluminum stearate, calcium stearate and magnesium stearate; from about 0.1 to about 2 parts by weight of ethoxylated phenol wetting agent; from about 0.015 to about 1.125 parts by weight of a cyclized rubber; and the balance water; the ratio by weight between said silicones and said wax being in the range from about 2.5 to about 4.1; the ratio by weight between said silicones and said mineral oil being in the range from about 0.3 to about 0.5; the ratio by weight between said silicones and said aliphatic hydrocarbon being in the range from about 0.15 to about 0.23; whereby there is provided a polish having a controlled rate of evaporation and capable of withstanding large differentials in temperature which has a long shelf life and is applicable to an automobile finish as a dilute solution in hot water to provide a protective coating having high detergent and wear resistance and a deep luster.

16. A polish having a controlled rate of evaporation and capable of withstanding large differentials in temperature which is applicable to an automobile finish as a dilute solution in hot water, said polish comprising an aminofunctional silicone, a silicone resin film former, and a dimethyl silicone fluid present in a combined amount of from about 4 to about 5 parts by weight with the aminofunctional silicone being present in an amount not less than 0.1 parts by weight, the silicone resin film former being present in an amount not less than 0.1 parts by weight, and the dimethyl silicone fluid being present in an amount not less than 0.1 parts by weight; about 1.0 parts by weight emulsifiable microcrystalline wax and about 0.2 parts by weight carnauba wax; about 11 parts by weight of a mineral oil having an SSU viscosity at 100° F. of about 45; about 21 parts by weight of an aliphatic hydrocarbon having an initial boiling point of about 410° F. and an end boiling point of about 484° F.; between about 5 and 6 parts by weight dicoco dimethyl ammonium chloride; about 0.5 parts by weight ethomeen acetate; about 0.7 parts by weight nonylphenol ethylene oxide wetting agent; about 0.5 parts by weight isopropyl alcohol; about 0.0075 parts by weight tallow fatty acid; about 0.0075 parts by weight morpholine; about 0.07 parts by weight thixotropic viscosity modifier; about 0.03 parts by weight cyclized rubber; about 0.08 parts by weight amine acetate emulsifier; the balance water; the ratio by weight between said silicones and said wax being in the range from about 2.5 to about 4.1; the ratio by weight between said silicones and said mineral oil being in the range from about 0.3 to about 0.5; the ratio by weight between said silicones and said aliphatic hydrocarbon being in the range from about 0.15 to about 0.23; whereby there is provided a polish having a controlled rate of evaporation and capable of withstanding large differentials in temperature which is applicable to an automobile finish as a dilute solution in hot water to provide a protective coating having high detergent and wear resistance and a deep luster.

17. A method of preparing a polish having a controlled rate of evaporation and capable of withstanding large differentials in temperature which is applicable to an automobile finish as a dilute solution in hot water, said method comprising mixing together until thoroughly uniform about 80% of from about 3 to about 6 parts by weight of a combination of aminofunctional silicones and dimethyl silicone fluids with from about 6 to about 16 parts by weight of a mineral oil having an SSU viscosity at 100° F. in the range between about 40 and about 100 with about 50% of from about 13 to about 31 parts by weight of an aliphatic hydrocarbon having an initial boiling point of about 375° F. and an end boiling point of about 500° F. with about 0.1 to about 2 parts by weight of an ethoxylated phenol wetting agent and about 0.1 to about 10 parts by weight of dicoco dimethyl ammonium chloride; mixing until thoroughly uniform the remaining amount of the silicones and from about 0.1 to about 3.5 parts by weight of a combination of ethomeen and glacial acetic acid; combining the above named mixtures and mixing while maintaining the temperature at about 180° F.; adding about 4 parts by weight of the aliphatic hydrocarbon and about 0.8 to about 1.4 parts by weight of an emulsifiable microcrystalline wax to the above mixture while continuously agitating and maintaining the mixture temperature at about 195° F.; adding to the mixture about 0.015 to about 1.125 parts by weight of a cyclized rubber dissolved in the remainder of the aliphatic hydrocarbon; maintaining the mixture at about 190° F. while adding sufficient soft water to make up 100 parts of the mixture and thereafter cooling the mixture while agitating until the entire mixture is thoroughly uniform and clear; whereby there is provided a polish having a controlled rate of evaporation and capable of withstanding large differentials in temperature which is applicable to an automobile finish as a dilute solution in hot water to provide a protective coating having high detergent and wear resistance and a deep luster.

* * * * *